US007548535B1

(12) United States Patent
Godwin

(10) Patent No.: US 7,548,535 B1
(45) Date of Patent: Jun. 16, 2009

(54) CUSTOMER ACTIVATION OF TELEPHONY SERVICES IN INTEGRATED DIGITAL NETWORKS

(75) Inventor: John P. Godwin, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1082 days.

(21) Appl. No.: 10/431,756

(22) Filed: May 8, 2003

(51) Int. Cl.
*H04L 12/66* (2006.01)

(52) U.S. Cl. ........................... 370/352; 370/357

(58) Field of Classification Search .................. None
See application file for complete search history.

(56) References Cited

U.S. PATENT DOCUMENTS

| 5,838,665 | A | 11/1998 | Kahn et al. | |
|---|---|---|---|---|
| 5,917,537 | A * | 6/1999 | Lightfoot et al. | 725/4 |
| 5,917,817 | A | 6/1999 | Dunn et al. | |
| 6,011,794 | A | 1/2000 | Mordowitz et al. | |
| 6,141,341 | A | 10/2000 | Jones et al. | |
| 6,163,536 | A | 12/2000 | Dunn et al. | |
| 6,169,734 | B1 | 1/2001 | Wilson | |
| 6,278,704 | B1 | 8/2001 | Creamer et al. | |
| 6,337,858 | B1 | 1/2002 | Petty et al. | |
| 6,343,119 | B1 * | 1/2002 | Creamer et al. | 379/100.1 |
| 6,345,047 | B1 | 2/2002 | Regnier | |
| 6,370,399 | B1 * | 4/2002 | Phillips | 455/564 |
| 7,203,187 | B1 * | 4/2007 | Richardson et al. | 370/352 |
| 2001/0018656 | A1 | 8/2001 | Weik et al. | |
| 2001/0021648 | A1 * | 9/2001 | Fougnies et al. | 455/408 |
| 2001/0038624 | A1 * | 11/2001 | Greenberg et al. | 370/352 |
| 2002/0006194 | A1 * | 1/2002 | Maytal | 379/399.01 |
| 2003/0142664 | A1 * | 7/2003 | Gerszberg et al. | 370/354 |

* cited by examiner

*Primary Examiner*—Brenda Pham
*Assistant Examiner*—Rhonda Murphy

(57) ABSTRACT

A system and method for activating telephony service for a telephone coupled to a personal computer coupled to a high-bandwidth digital capacity. The system and method provides instantaneous activation and deactivation of a pre-established service agreement upon demand by a customer. In particular, the invention provides a system and method for service activation for Voice Over Internet Protocol (VoIP).

18 Claims, 6 Drawing Sheets

CUSTOMER ACTIVATION OF TELEPHONY SERVICES IN INTEGRATED DIGITAL NETWORKS

TECHNICAL FIELD

The present invention relates generally to a system and method for consumer activation of telephony services and more particularly to consumer activation of telephony services using a portion of the bandwidth of a high-speed digital access facility.

BACKGROUND OF THE INVENTION

Modern digital networks, such as the Internet, can provide a wide variety of services since the various services are implemented, at a core level, using similarly structured data packets or streams of data packets. Consumers now have the benefits of direct high-speed access to integrated digital networks through technology such as cable modems, Digital Subscriber Line (DSL) and wireless DSL.

DSL services may include a home gateway device that enables Voice-Over-IP (VoIP) services to DSL customers. VoIP provides consumers with the capability of acquiring voice or fax services without a service agreement with a telephone company.

SUMMARY OF THE INVENTION

The present invention is a method for consumer activation of derived telephony services. Derived services are defined as a two-way voice path that is implemented using a portion of the bandwidth of a high-speed digital access facility. The high-speed facility is "always-on" and available. Therefore, a consumer can be provided the capability of requesting telephony service on an as-needed basis. According to the present invention, the consumer requests and is granted the service nearly instantaneously since no new wire pairs or other new physical connection is required.

A home gateway device provides simultaneous delivery of data and one or more digitized telephone sessions over the high bandwidth channel. The high bandwidth channel itself may permit a consumer to delete a phone line because a separate phone line is no longer needed for dial-up Internet access. A VoIP offering then permits the customer to acquire a second line for voice/fax services without dealing with the phone company.

Currently, VoIP services are available to consumers through external high-bandwidth channels, such as DSL and cable providers. Typically, a telephone number is assigned through a central office. However, there is a need to simplify the connection process and make it more convenient to the consumer. The present invention provides a second phone line that is an "impulse" or lifestyle buying decision. The present invention is highly advantageous in situations where a second line is needed temporarily. For example, when adult children are home from college, when important home business, such as purchasing or renovating a home, requires a separate fax line.

It is an object of the present invention to provide a consumer with telephony service on-demand. It is another object of the present invention to establish a business relationship with a consumer and establish certain telephony network database elements in advance of the requested services. It is yet another object of the present invention to activate the telephony service using the telephone itself or via the Internet.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
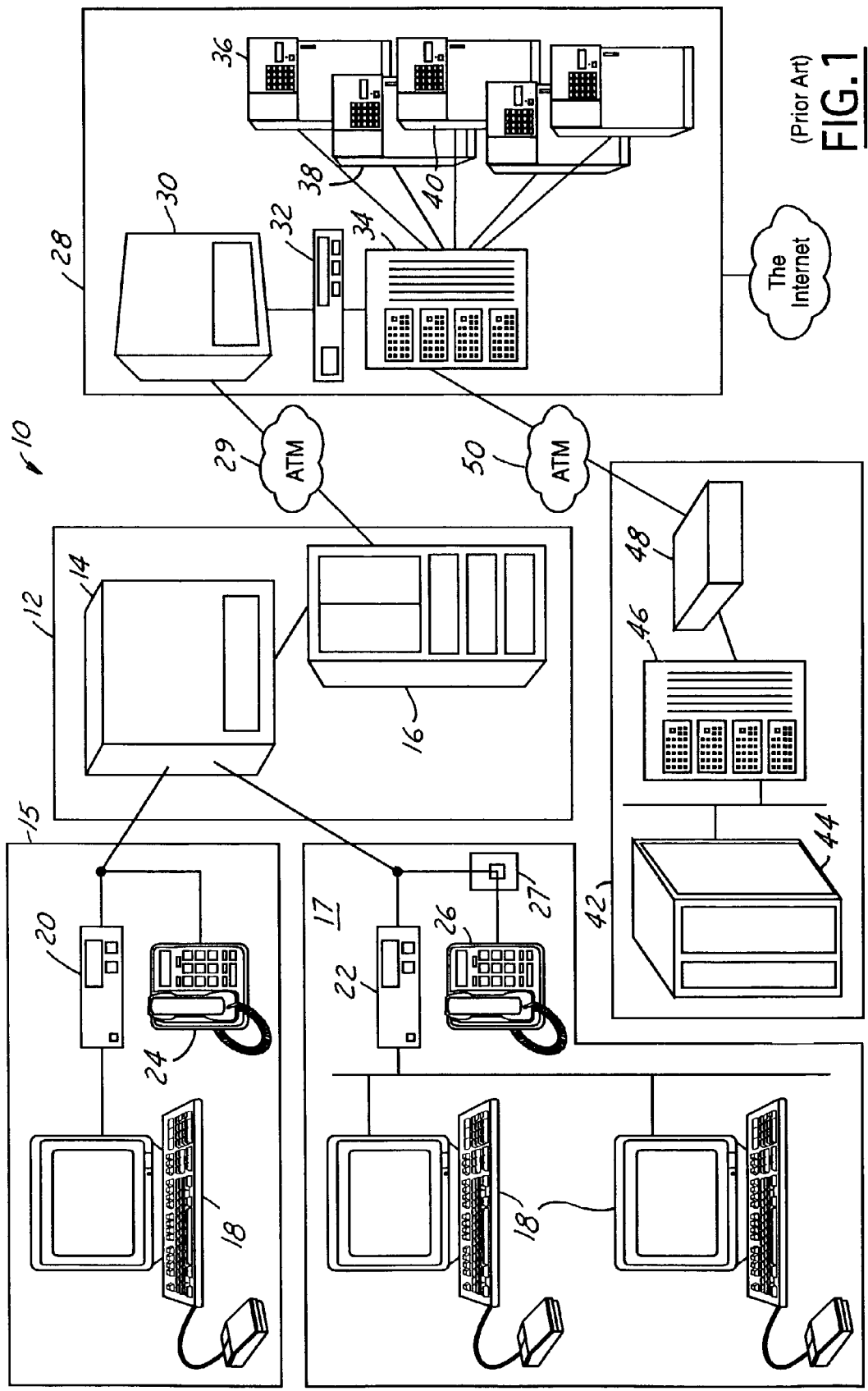
FIG. 1 is a prior art example of a DSL provider network configuration.

The present invention is described herein with reference to a DSL facility. It should be noted however, that it is applicable to other forms of high-bandwidth service as well, such as DSL, ADSL, ISDN, cable network, to name just a few. FIG. 1 is a block diagram of a typical DSL provider network 10. It is possible with today's technology to provide multiple additional telephone lines using an external high-bandwidth channel and bypassing the local telephone company. For example, a personal computer-coupled through a local area network to a personal computer that acts as a gateway to the external high-bandwidth channel such as DSL as shown in FIG. 1. The description addresses the situation in which at least one extra telephone session is enabled over an external high-bandwidth channel and an inside telephone wire coupled to a gateway personal computer. It should be noted however, that there are several alternative arrangements for enabling an extra telephone session using the external high-bandwidth channel. For example, the inside telephone wiring may be coupled to a broadband modem serving as a gateway. In another alternative, an interface card may be used.

FIG. 1 exemplifies a typical home DSL solution from a non-Incumbent Local Exchange Carrier. In other words, DSL service is provided by a firm other than the phone company. A central office 12 for the high-bandwidth service has the digital subscriber line access modem (DSLAM) 14 and an ATM access switch 16. In one example, the subscriber, or customer, premises 15 has a personal computer 18 and a DSL modem 20. In another example, the customer site 17 has one or more personal computers 18 and a DSL gateway 22. The telephone 24 is connected by way of a VoIP adapter within the gateway 20. The telephone 26 is connected to a VoIP adapter circuit card 27 within the personal computer 18.

The central office 12 is in communication with a point of presence 28 using connections 29 to an ATM network 30. A traffic management switch 32 is in communication with a third layer switch 34 of the ATM network 30 and provides links to a variety of services such as the Internet 36, Web mail 38, data cache 40 and others.

A production back office 44 has operational systems support 44, a switch 46 and a router 48 that also has ATM connections 50 to the third layer switch 34 of the ATM network 30 at the point of presence 28. The production back office 44 is a collection of systems with customer account information, call usage information, and billing information.

Figure 2:
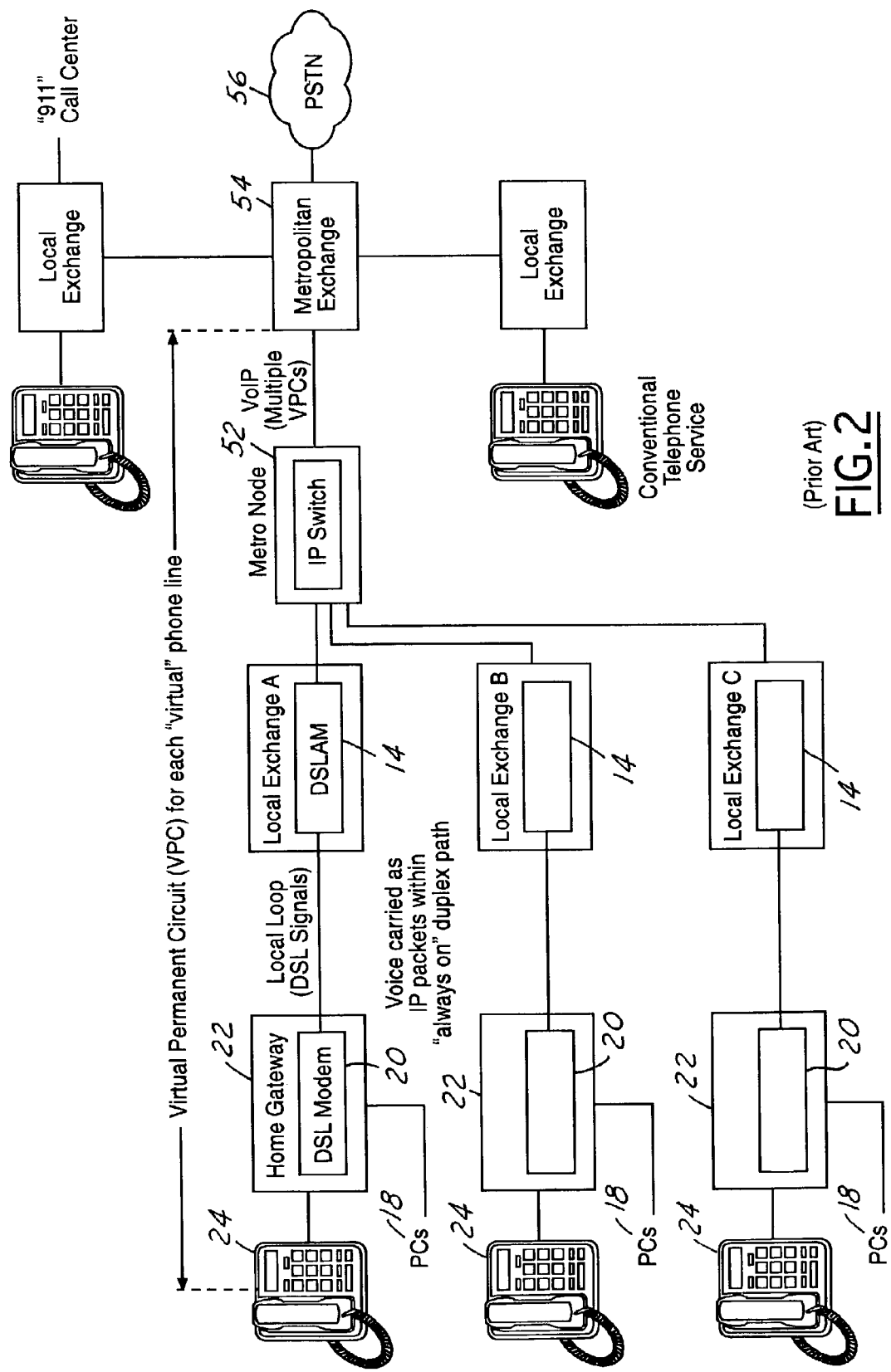
FIG. 2 is a block diagram of a prior art Voice-Over-IP network from the DSL provider network shown in FIG. 1.

FIG. 2 is an example of a voice-over-IP network using the home gateway 22 as provided by a DSL service provider. As described above, the customer, A, B, C, has connected any conventional telephone to the home gateway via conventional inside wiring and an adapter. It is also understood that according to the present invention, the customer has an existing relationship with the DSL service provider. In this arrangement, the DSL provider can remotely configure the home gateway 22 and the corresponding network elements to provide a permanent VoIP telephone service for outgoing and incoming calls.

A metro node 52 handles multiple virtual permanent circuits for the multiple virtual phone lines. A Metropolitan Exchange (ME) 54 provides VoIP services that are equivalent to the "local office" services provided by a telephone company 56. When VoIP customer density is low, the ME provides local office functions for multiple office codes and area codes. The ME provides a full suite of services such as call forwarding, call waiting, and calling party identification. The ME's lines are registered with local authorities for "911" services. Such methods for voice protocol over a digital subscriber line are known in the art. FIG. 2 is an example of one type of network arrangement, and it should be noted that other arrangements are possible without departing from the scope of the present invention, as described hereinafter.

Figure 3:
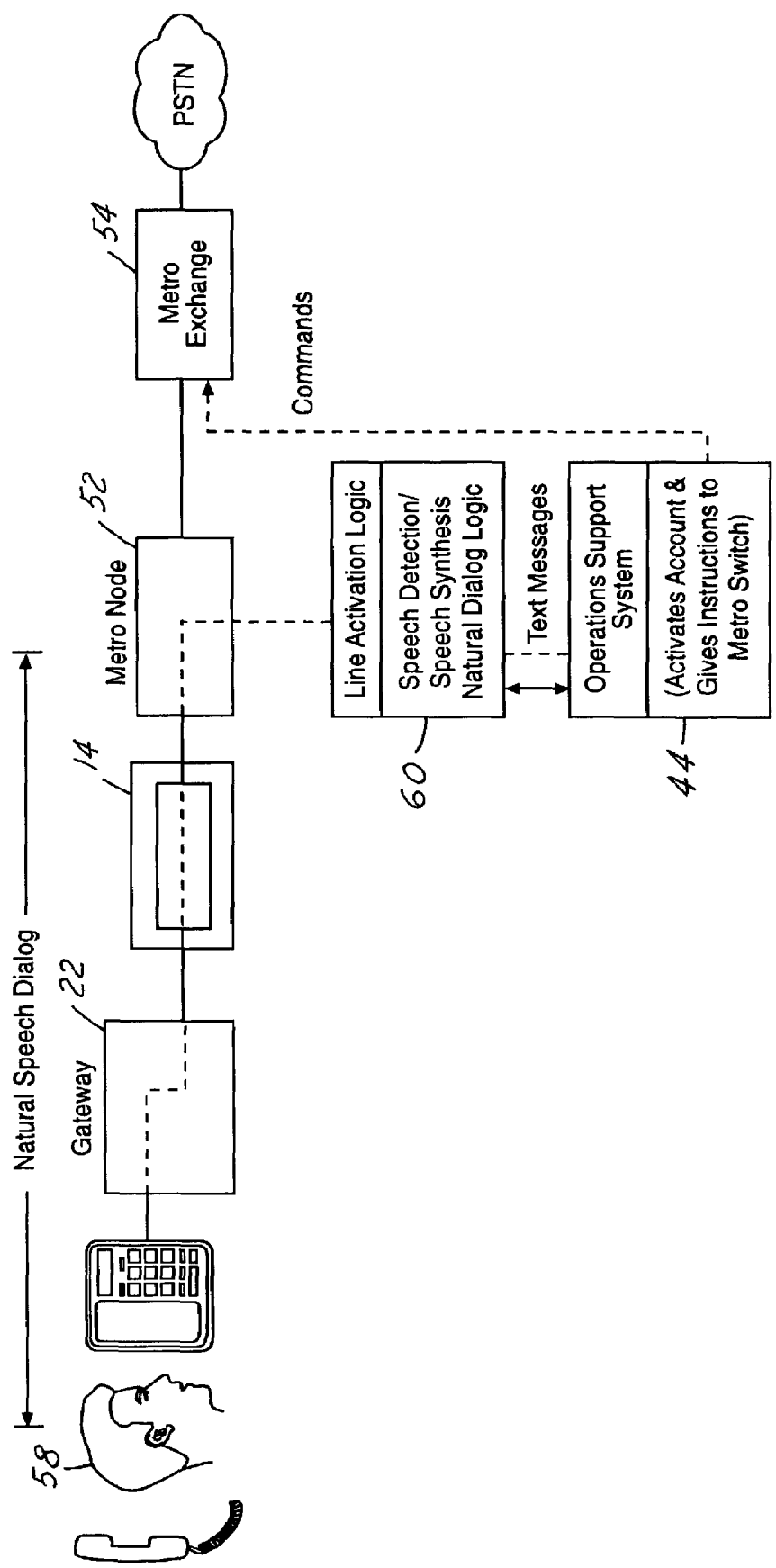
FIG. 3 is a block diagram of an embodiment of the present invention showing activation of the phone line by the customer by verbal commands to the metro node.

According to the present invention, the network is modified as shown in FIG. 3 to provide instant VoIP service activation upon demand rather than permanent VoIP service. A customer 58 activates or deactivates the telephone service by voice command, or using the phone 24 keypad. The network automatically gives the customer a series of questions. The customer responds using voice, or DTMF input instructions. The customer's answers are then automatically routed through the gateway 22 and local exchange 14 to the metro node 52, where the line activation logic 60 processes the customer's instructions and routes them directly to the operations support system 44. In FIG. 3, the network element interfacing to the customer 58 is located at the metro node 52.

Figure 4:
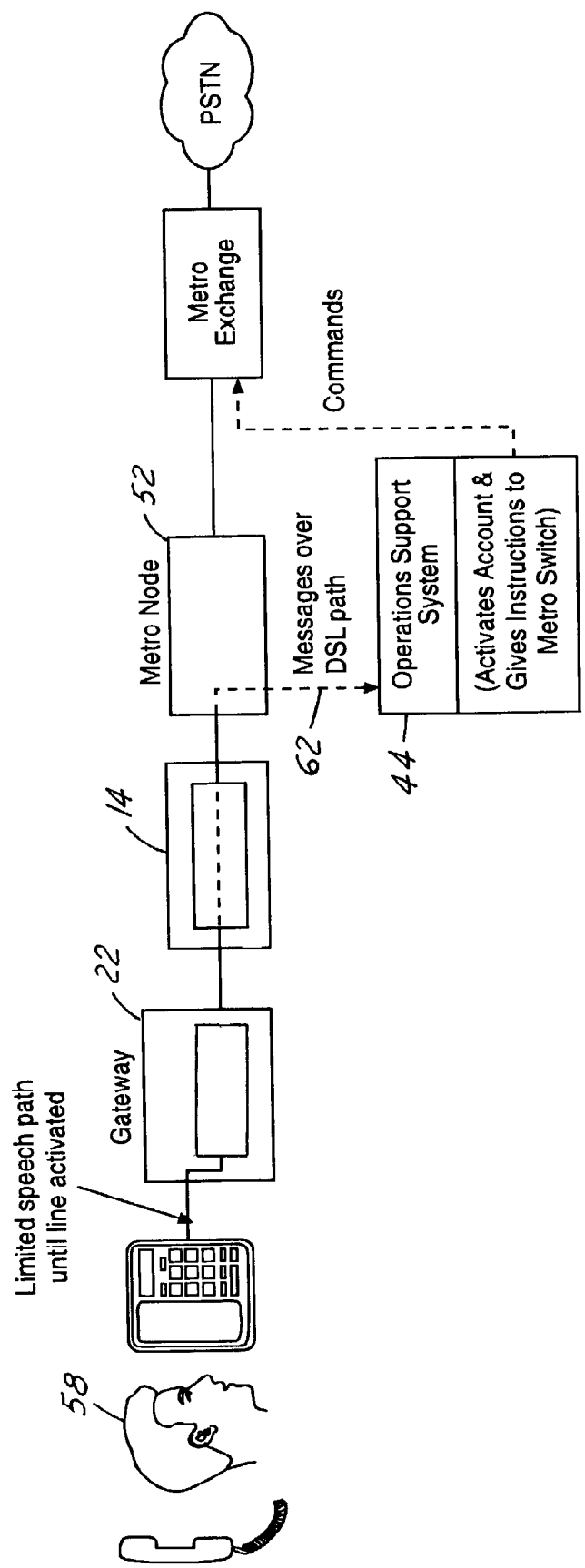
FIG. 4 is a block diagram of an embodiment of the present invention showing activation of the phone line by the customer by verbal commands to the gateway.
Figure 5:
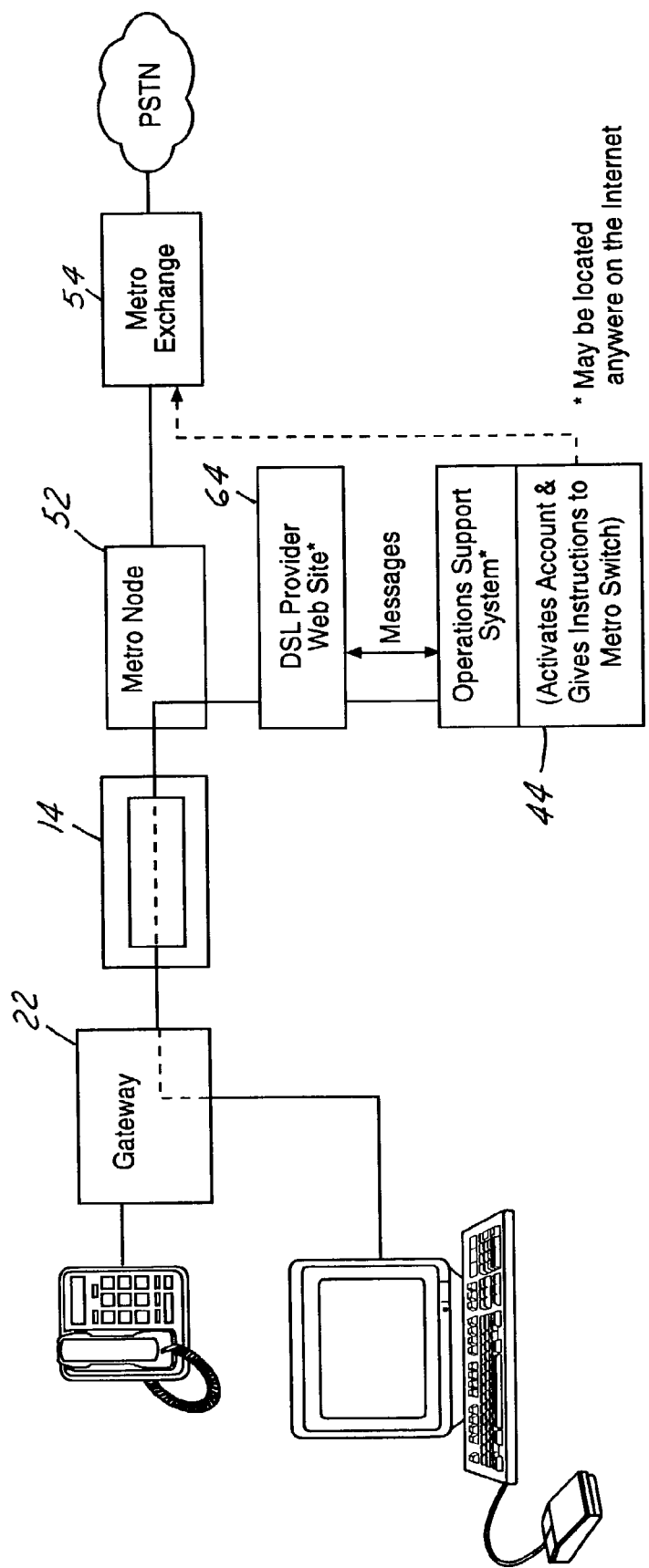
FIG. 5 is a block diagram of an embodiment of the present invention showing activation of the phone line by the customer by Internet.

FIG. 4 is an alternate embodiment, in which the network element interfacing to the customer is contained entirely within the gateway 22 and the messages from the customer are delivered over the DSL path 62. In yet another alternative, shown in FIG. 5, the customer is capable of providing activation/deactivation commands by logging into the service provider's website 64.

Figure 6:
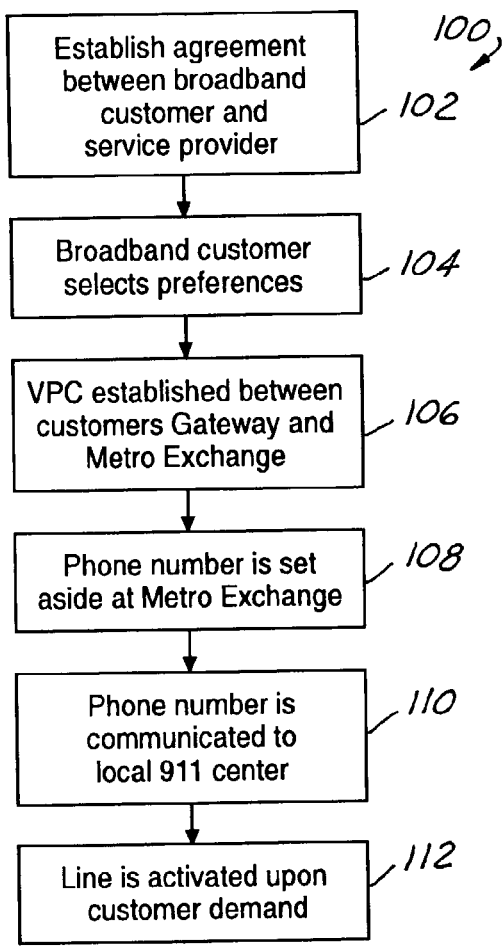
FIG. 6 is a flowchart of the method of the present invention.

FIG. 6 is a flow chart of the instant activation method 100 of the present invention. It is assumed there is a preexisting business relationship between the customer and the service provider 102. It is assumed the customer is also a broadband customer and that there is prior agreement to certain aspects of the telephony service. The service provider may provide selections for the customer to set their preferences. These preferences may include, but are not limited to; no service at all, activation by web, voice command, call to customer service or a password, a minimum activation for a selected period, passive or active renewal after an initial activation, the handling of incoming calls after deactivation such as a recording indicating deactivation of number, forwarding number, number referral, automatic reactivation when the number receives an incoming call. Preferences for the selections would be made by the customer 104 upon the initial activation and then remain the same, or may be changed as desired upon future activations. These technical options are easily implemented through software-controlled telephone switches. While several examples are provided herein, it should be noted that more or less may be implemented and may be limited to the customer by the price set by the provider and current FCC rules and regulations.

A virtual permanent circuit (VPC) is established 106 between the customer's gateway and the Metro Exchange. The VPC is given priority for transport capacity when a call is active, but otherwise the capacity is available for "bursty" applications such as web access. A phone number is established and set aside 108 at the metropolitan exchange. This number is not communicated to the public telephone network. The number and the customer's address are communicated 110 to the local emergency center, such as a 911 center. It is possible to provide the customer with the capability to get automatic connection to an emergency service without the need for intermediate activation steps.

Figure 7:
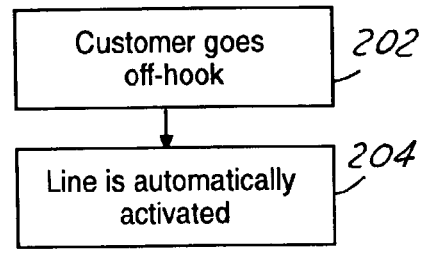
FIG. 7 is a flowchart of a method for instant telephony activation according to one embodiment of the present invention.
Figure 8:
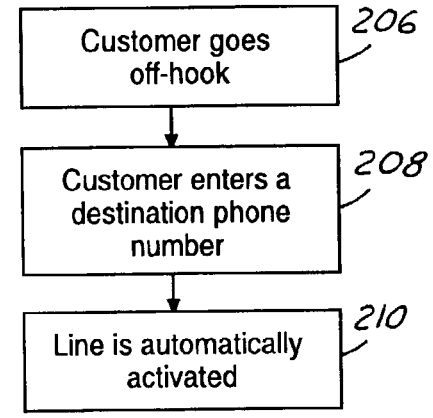
FIG. 8 is a flowchart of a method for instant telephony activation according to another embodiment of the present invention.

The prior agreement between the customer and the service provider will determine how and when the line is activated 112. It is possible to have the line activated simply by going off-hook. FIG. 7 is a simple flow chart of this method. The customer goes off-hook 202, and the line is automatically activated 204. However, since even accidentally knocking the handset off the cradle would activate the service, this basic approach is probably not a preferred method. A more likely scenario, shown in FIG. 8, is to require complete entry of a syntactically valid phone number to activate the pre-agreed service arrangement. For example, a customer goes off-hook 206, hears a dial tone from the system and then enters a destination phone number 208. At this point, the line is automatically activated 210.

Figure 9:
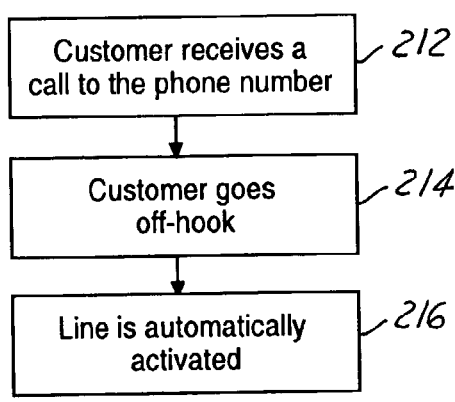
FIG. 9 is a flowchart of a method for instant telephony activation according to yet another embodiment of the present invention.

In an alternate method of activation shown in FIG. 9, the customer receives a phone call to the number 212. When the line is answered by going off-hook 214, the line is automatically activated 216.

Figure 10:
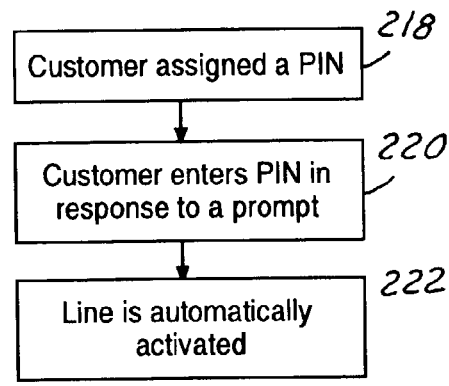
FIG. 10 is a flowchart of a method for instant telephony activation according to still another embodiment of the present invention.

Yet another embodiment of the present invention, shown in FIG. 10, assigns a personal identification number (PIN) 218 to the customer. When the customer goes off-hook, the PIN is entered in response to a prompt 220 and the line is activated 222. The PIN may be in the form of a four digit number, or may be in the form of a telephone number, such as the pre-assigned number set aside for the customer at the metropolitan exchange.

The present invention provides self-activation of telephony services carried over integrated digital networks such as DSL. The self-activation is by way of voice or tone commands using the line being activated or over the Internet by way of a provider website. The customer is also able to modify the service arrangements by any of the same methods.

The invention covers all alternatives, modifications, and equivalents, as may be included within the spirit and scope of the appended claims.

What is claimed is:

1. A method for on-demand access to telephony services over an integrated digital network comprising the steps of:
    establishing a service agreement between a broadband customer and a network service provider;
    providing connection to a conventional telephone connected to a home gateway by way of conventional wiring;
    obtaining customer preferences for instant telephony services, the customer preferences including an activation of temporary telephony services;
    receiving an impulse request from the broadband customer for temporary telephony services extending over a predetermined time period;
    establishing a virtual permanent circuit between the broadband customer and a metropolitan exchange for the network service provider using the home gateway;
    reserving a dedicated phone number at the metropolitan exchange for the instant telephony services of the broadband customer; and
    instantaneously activating and deactivating a telephony line assigned to the dedicated phone number using the home gateway in response to the impulse request for temporary telephony services and according to the customer preference.

2. The method as claimed in claim 1 wherein the integrated digital network is a digital subscriber line.

3. The method as claimed in claim 1, wherein the impulse request comprises at least one predetermined number to activate or deactivate the telephony line.

4. The method as claimed in claim 3 wherein the at least one predetermined number is a personal identification number and said method further comprises the service provider assigning a personal identification number to the broadband customer upon establishing a service agreement.

5. The method as claimed in claim 3 wherein the personal identification number is the reserved phone number.

6. The method as claimed in claim 3 wherein the at least one predetermined number is one of several phone numbers pre-selected by the broadband customer.

7. The method as claimed in claim 1 wherein the step of activating or deactivating the telephony line further comprises the broadband customer accessing a network provider website.

8. The method as claimed in claim 1 further comprising the step of communicating the reserved phone number to a local emergency center.

9. The method as claimed in claim 8 further comprising the step of allowing instant activation upon placing a call to the local emergency center.

10. The method as claimed in claim 1 further comprising the step of handling incoming calls after the telephony service is de-activated.

11. The method as claimed in claim 10 further comprising the steps of forwarding the calls to a predetermined phone number.

12. The method as claimed in claim 10 further comprising the step of playing a recording referring that calls be placed to an alternate phone number.

13. The method as claimed in claim 10 further comprising the step of automatically re-activating the service when an incoming phone call is received.

14. The method of claim 1, wherein the telephony services comprises voice over Internet protocol (VoIP) services.

15. A system for instantaneously activating telephony services comprising:
    a plurality of local office areas;
    a gateway connected to a personal computer coupled to a high-bandwidth channel connected to at least one of the plurality of local office areas defining a calling party location;
    a telephone connected to the gateway by way of conventional wiring inside the calling party location;
    a metropolitan exchange that accommodates a plurality of local office areas based on a calling party location;
    a preestablished service agreement with a network provider and having a predetermined phone number reserved at the metropolitan exchange, the service agreement having customer preferences including an activation of temporary telephony services;
    wherein the telephony service is instantaneously activated at the metropolitan exchange upon receipt of an impulse request for temporary telephony services extending over a predetermined time period through the gateway.

16. The system as claimed in claim 15 further comprising voiceband interface equipment located at a metro node.

17. The system as claimed in claim 15 further comprising voiceband interface equipment located within the gateway.

18. The system of claim 15, wherein the telephony services comprises voice over Internet protocol (VoIP) services.

* * * * *